United States Patent
Shiraishi

(12) 
(10) Patent No.: US 9,256,561 B2
(45) Date of Patent: Feb. 9, 2016

(54) COMMUNICATION CONTROL APPARATUS AND METHOD OF CONTROLLING THE SAME

(75) Inventor: Yasuhiro Shiraishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 117 days.

(21) Appl. No.: 13/275,663

(22) Filed: Oct. 18, 2011

(65) Prior Publication Data

US 2012/0102244 A1   Apr. 26, 2012

(30) Foreign Application Priority Data

Oct. 20, 2010 (JP) ................................. 2010-235876
Sep. 28, 2011 (JP) ................................. 2011-213383

(51) Int. Cl.
G06F 13/42 (2006.01)
G06F 13/38 (2006.01)

(52) U.S. Cl.
CPC .................................. *G06F 13/385* (2013.01)

(58) Field of Classification Search
None
See application file for complete search history.

(56) References Cited

U.S. PATENT DOCUMENTS

| | | | | |
|---|---|---|---|---|
| 8,078,973 | B1* | 12/2011 | Luttmann et al. ............. | 715/736 |
| 8,112,571 | B1* | 2/2012 | Letourneur .................... | 710/311 |
| 2005/0235091 | A1* | 10/2005 | Chen et al. .................... | 710/313 |
| 2010/0049895 | A1* | 2/2010 | Liang ............................ | 710/308 |
| 2011/0022768 | A1* | 1/2011 | Ulenas .......................... | 710/311 |
| 2011/0179201 | A1* | 7/2011 | Monks et al. ................. | 710/60 |
| 2011/0219163 | A1* | 9/2011 | Beadnell et al. .............. | 710/315 |
| 2012/0254486 | A1* | 10/2012 | Tausher et al. ................ | 710/63 |

FOREIGN PATENT DOCUMENTS

| | | |
|---|---|---|
| JP | H07-320018 A | 12/1995 |
| JP | 2005-327247 A | 11/2005 |
| JP | 2006-146401 A | 6/2006 |

OTHER PUBLICATIONS

Universal Serial Bus 3.0 Specificaiton, Revision 1.0, Nov. 12, 2008.*
Universal Serial Bus 3.0 Specification, Revision 1.0, Nov. 12, 2008.
Ishii, "Explore the capabilities of USB 3.0", Embedded Press, Japan, Gijutsu-Hyohron Co., Ltd., May 25, 2010, vol. 19, pp. 70-77.
Kuwano, "Introduction to USB device design which can be used immediately in Windows", Interface, Japan, CQ Publishing Co., Ltd., Mar. 1, 2010, vol. 36, No. 3, pp. 54-65.
Japanese Office Action issued in corresponding application No. 2011213383 on Aug. 10, 2015.

* cited by examiner

*Primary Examiner* — Ilwoo Park
(74) *Attorney, Agent, or Firm* — Carter, DeLuca, Farrell & Schmidt, LLP

(57) ABSTRACT

A communication control apparatus includes a first interface, a second interface, a determination unit, and a control unit. The first interface is connected to a detachable recording medium. The second interface is connected to an external device. The second interface includes a first bus controlled by a first bus controller and a second bus controlled by a second bus controller. The second bus has a maximum transfer rate less than that of the first bus. The determination unit is configured to determine a data transfer rate of the detachable recording medium when the detachable recording medium is connected to the first interface. The control unit is configured to establish a connection to the external device via the first bus when the determined data transfer rate exceeds a predetermined threshold, and via the second bus when the determined data transfer rate does not exceed the predetermined threshold.

7 Claims, 13 Drawing Sheets

F I G. 13
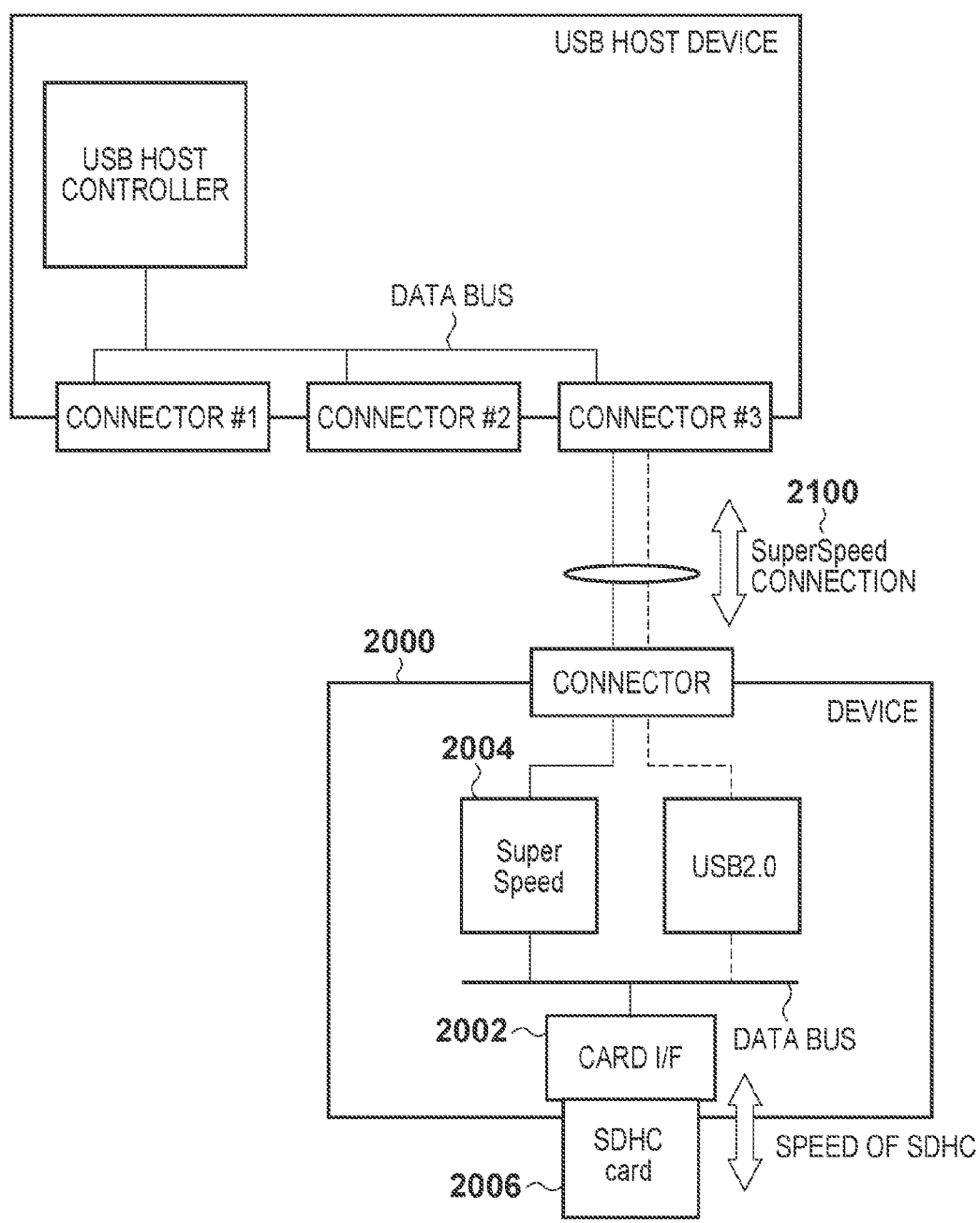

COMMUNICATION CONTROL APPARATUS AND METHOD OF CONTROLLING THE SAME

BACKGROUND OF THE INVENTION

1. Field of the Invention

Embodiments of the present invention relate to communication control and, more particularly, to a communication control technique to be used when connecting a peripheral device via a connector having a plurality of independent data buses.

2. Description of the Related Art

USB 3.0 (Universal Serial Bus 3.0 Specification, Revision 1.0, Nov. 12, 2008) implements a maximum data transfer rate of 5 Gbps and has been developed recently as a next-generation high-speed interface. USB 3.0 includes a SuperSpeed (SS) mode (5 Gbps). USB 3.0 also supports the three transfer modes for use with existing USB 2.0: High-Speed (480 Mbps) mode, Full-Speed (12 Mbps) mode, and Low-Speed (1.5 Mbps) mode.

In general, the bus architecture of a USB host device is configured to branch from one host controller to a plurality of connectors. When a plurality of devices are connected, the host controller allocates 5-Gbps of bandwidth to the plurality of connected devices, which share the bandwidth to implement data transfer to each device. For this reason, when the plurality of devices are transferring data simultaneously, the data transmission bandwidth assigned to each device becomes narrower.

Nevertheless, transfer rates of recording media interfaces have increased. For example, the SD card standard SDXC (eXtended Capacity) defines a plurality of transfer modes and is supposed to implement data transfer at 2.4 Gbps in its fastest transfer mode. SDXC is also downward compatible with existing SDHC (High Capacity) and SD.

In this case, as shown in FIG. 13, a device 2000 may be assumed, which includes a card interface 2002 corresponding to SDXC and an SS controller 2004 corresponding to USB 3.0. When the SDHC card is used, the speed of the card interface 2002 is generally less than 480 Mbps, which is the maximum speed of the USB 2.0 mode. Hence, the benefits brought about by the use of the SS mode for connection to the USB host device are small. From the viewpoint of system operation, it would be preferable to connect the device using the USB 2.0 mode so as to save the SS mode bandwidth for other devices requiring high-speed transfer. For example, Japanese Patent Laid-Open No. 2005-327247 has proposed a technique of providing a mechanical switch for switching the transfer unit on the peripheral device (device) side and allowing the user to operate the switch in order to select the data transfer unit to be used in accordance with the operation method.

However, according to the above-described conventional technique, the user must determine whether high-speed transfer is necessary and then manually switch the data transfer unit accordingly. This makes user operation cumbersome.

Embodiments of the present invention provide a communication control technique that more suitably allows for the execution of data transfer when connecting a host device and a device via a connector having a plurality of independent data buses.

SUMMARY OF THE INVENTION

According to one aspect of an embodiment of the present invention, a communication control apparatus includes: a first interface to be connected to a detachable recording medium; a second interface to be connected to an external device, the second interface including a first bus controlled by a first bus controller and a second bus controlled by a second bus controller, the second bus having a maximum transfer rate less than that of the first bus; a determination unit configured to determine a data transfer rate of the detachable recording medium when the detachable recording medium is connected to the first interface; and a control unit configured to establish a connection to the external device via the first bus, when the data transfer rate determined by the determination unit exceeds a predetermined threshold, and to establish a connection to the external device via the second bus when the data transfer rate determined by the determination unit does not exceed the predetermined threshold.

According to another aspect of an embodiment of the present invention, a communication control apparatus includes: an interface including a first bus controlled by a first bus controller and a second bus controlled by a second bus controller, the second bus having a maximum transfer rate less than that of the first bus; a determination unit configured to determine a data transfer rate of the detachable recording medium when a reading device including a first interface to be connected to a detachable recording medium and a second interface including the first bus and the second bus is connected to the interface, and the detachable recording medium is connected to the first interface; and a control unit configured to establish a connection to the reading device via the first bus when the data transfer rate determined by the determination unit exceeds a predetermined threshold, and to establish a connection to the reading device via the second bus when the data transfer rate determined by the determination unit does not exceed the predetermined threshold.

According to still another aspect of an embodiment of the present invention, a communication control apparatus includes: an image capture unit configured to capture an image of an object and obtain image data; a first interface to be connected to a detachable recording medium to record, on the detachable recording medium, the image data obtained by the image capture unit; a second interface to be connected to an external device, the second interface including a first bus and a second bus, the second bus having a maximum transfer rate less than that of the first bus; a determination unit configured to determine a data transfer rate of the detachable recording medium; and a control unit configured to control transfer of the image data from the recording medium to the external device, wherein the first interface is configured to record the image data obtained by the image capture unit on the detachable recording medium even when the external device is not connected to the second interface, and the control unit establishes a connection to the external device via the first bus when the data transfer rate determined by the determination unit exceeds a predetermined value, and establishes a connection to the external device via the second bus when the data transfer rate determined by the determination unit does not exceed the predetermined value.

According to yet another aspect of an embodiment of the present invention, a method of controlling a communication control apparatus including a first interface to be connected to a detachable recording medium, and a second interface to be connected to an external device, the second interface including a first bus controlled by a first bus controller and a second bus controlled by a second bus controller, the second bus having a maximum transfer rate less than that of the first bus, includes: determining a data transfer rate of the detachable recording medium when the detachable recording medium is connected to the first interface; and controlling to establish a connection to the external device via the first bus when the data transfer rate determined in the determining the data transfer rate exceeds a predetermined threshold, and to establish a connection to the external device via the second bus when the data transfer rate determined in the determining does not exceed the predetermined threshold.

According to still yet another aspect of an embodiment of the present invention, a method of controlling a communication control apparatus including an interface, which includes a first bus controlled by a first bus controller and a second bus controlled by a second bus controller, the second bus having a maximum transfer rate less than that of the first bus, includes: determining a data transfer rate of a detachable recording medium when a reading device, which includes a first interface to be connected to the detachable recording medium and a second interface that includes the first bus and the second bus, is connected to the interface, and the detachable recording medium is connected to the first interface; and controlling to establish a connection to the reading device via the first bus when the data transfer rate determined in the determining the data transfer rate operation exceeds a predetermined threshold, and to establish a connection to the reading device via the second bus when the data transfer rate determined in the determining does not exceed the predetermined threshold.

According to yet still another aspect of an embodiment of the present invention, a method of controlling a communication control apparatus including a first interface to be connected to a detachable recording medium to record, on the detachable recording medium, image data obtained by an image capture unit configured to capture an object to obtain the image data, and a second interface to be connected to an external device, the second interface including a first bus and a second bus, the second bus having a maximum transfer rate less than that of the first bus, includes: determining a data transfer rate of the detachable recording medium; and controlling transfer of the image data from the recording medium to the external device, wherein the first interface is configured to record the image data obtained by the image capture unit on the detachable recording medium even when the external device is not connected to the second interface, and wherein, in the controlling transfer, control is executed to establish a connection to the external device via the first bus when the data transfer rate determined in the determining the data transfer rate exceeds a predetermined value, and to establish a connection to the external device via the second bus when the data transfer rate determined in the determining does not exceed the predetermined value.

According to still yet another aspect of an embodiment of the present invention, a non-transitory computer-readable storage medium storing a computer program, the computer program, when executed by a computer, causing the computer including a first interface to be connected to a detachable recording medium; and a second interface to be connected to an external device, the second interface including a first bus controlled by a first bus controller and a second bus controlled by a second bus controller, the second bus having a maximum transfer rate less than that of the first bus, to function as: a determination unit configured to determine a data transfer rate of the detachable recording medium when the detachable recording medium is connected to the first interface; and a control unit configured to establish a connection to the external device via the first bus when the data transfer rate determined by the determination unit exceeds a predetermined threshold, and to establish a connection to the external device via the second bus when the data transfer rate determined by the determination unit does not exceed the predetermined threshold.

According to yet still another aspect of an embodiment of the present invention, a non-transitory computer-readable storage medium storing a computer program, the computer program, when executed by a computer, causing the computer including an interface, which includes a first bus controlled by a first bus controller and a second bus controlled by a second bus controller, the second bus having a maximum transfer rate less than that of the first bus, to function as: a determination unit configured to determine a data transfer rate of a detachable recording medium when a reading device, which includes a first interface to be connected to the detachable recording medium and a second interface including the first bus and the second bus, is connected to the interface, and the detachable recording medium is connected to the first interface; and a control unit configured to establish a connection to the reading device via the first bus when the data transfer rate determined by the determination unit exceeds a predetermined threshold, and to establish a connection to the reading device via the second bus when the data transfer rate determined by the determination unit does not exceed the predetermined threshold.

According to still yet another aspect of an embodiment of the present invention, a non-transitory computer-readable storage medium storing a computer program, the computer program, when executed by a computer, causing the computer including a first interface to be connected to a detachable recording medium to record, on the detachable recording medium, image data obtained by an image capture unit configured to capture an object to obtain the image data; and a second interface to be connected to an external device, the second interface including a first bus and a second bus, the second bus having a maximum transfer rate less than that of the first bus, to function as: a determination unit configured to determine a data transfer rate of the detachable recording medium; and a control unit configured to control transfer of the image data from the recording medium to the external device, wherein the first interface is configured to record the image data obtained by the image capture unit on the detachable recording medium even when the external device is not connected to the second interface, and the control unit establishes a connection to the external device via the first bus when the data transfer rate determined by the determination unit exceeds a predetermined value, and establishes a connection to the external device via the second bus when the data transfer rate determined by the determination unit does not exceed the predetermined value.

According to disclosed aspects of embodiments of the present invention, it is possible to provide a communication control technique that more suitably allows for the execution of data transfer when connecting a host device and a device via a connector having a plurality of independent data buses.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a block diagram of a device configured as an SD card reader.

DESCRIPTION OF THE EMBODIMENTS

Preferred embodiments of the present invention will now be described in detail with reference to the accompanying drawings. Note that the following embodiments are merely examples and do not limit the scope of the present invention. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

First Embodiment

As the first embodiment of a communication control apparatus, a communication control apparatus 400 (to be referred to as a device 400 hereinafter) including a host controller complying with the universal serial bus (USB) 3.0 specification will be exemplified below. Note that portions unique to disclosed features of an embodiment of the present invention will mainly be described in the following explanation. Note, further, that a general, detailed operation concerning the USB 3.0 specification may be understood by referring to the USB 3.0 specification (Universal Serial Bus 3.0 Specification, Revision 1.0, Nov. 12, 2008).

<USB 3.0 Architecture>

Figure 1:
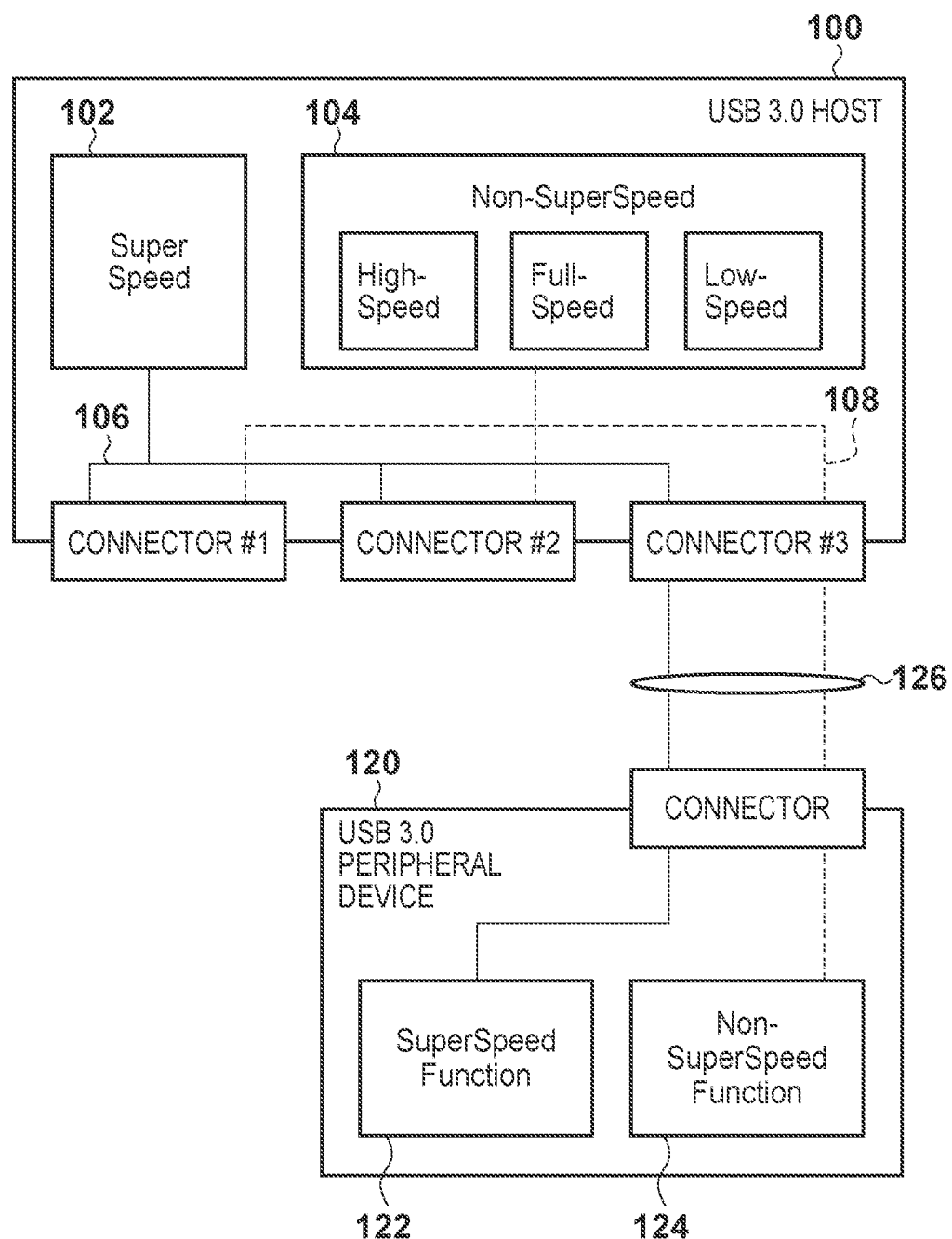
FIG. 1 is a block diagram for explaining the USB 3.0 bus architecture.

The USB 3.0 bus architecture will be described next. FIG. 1 is a block diagram for explaining the USB 3.0 bus architecture.

A host device 100 includes a host controller 102 (to be referred to as an SS 102 hereinafter) (first bus controller) to be used in SS (SuperSpeed) mode connection. The host device 100 also includes a host controller 104 (to be referred to as an NSS 104 hereinafter) (second bus controller) to be used in NSS (Non-SuperSpeed) mode connection. The NSS 104 controls data transfer in the High-Speed (HS), Full-Speed (FS), and Low-Speed (LS) modes defined by the USB 2.0 specification. The SS 102 controls data transfer in the SuperSpeed (SS) mode newly defined by the USB 3.0 specification. Note that each of the SS 102 and the NSS 104 incorporates a link control unit to be described later. A bus 106 is dedicated to the SS, and a bus 108 is dedicated to the NSS.

A device 120 is a USB 3.0 peripheral device and includes a device function controller 122 (to be referred to as an SSF 122 hereinafter) to be used in SS (SuperSpeed) mode connection. The device 120 also includes a device function controller 124 (to be referred to as an NSSF 124 hereinafter) to be used in NSS (Non-SuperSpeed) mode connection. Like the above-described host controllers, the NSSF 124 controls data transfer in the modes defined by the USB 2.0 specification, and the SSF 122 controls data transfer in the SuperSpeed (SS) mode. Note that each of the SSF 122 and the NSSF 124 incorporates a link control unit to be described later. Note, further, that the host controllers and the device function controllers will generically be referred to as bus controllers.

A cable 126 is a USB 3.0 cable. Data signal lines for the SS mode and those for the NSS mode exist independently in the cable 126. As described above, the host device 100 independently includes the bus 106 (first bus) for the SS and the bus 108 (second bus) for the NSS. For this reason, for example, the host device 100 may execute data transfer via the bus 106 to/from a peripheral device connected to connector #3 and simultaneously execute data transfer via the bus 108 to/from another peripheral device connected to connector #1 that is one of the connection connectors.

Since each of the SS 102 and the NSS 104 is connected to a plurality of connectors, a plurality of peripheral devices may be connected to each controller to transfer data. In this case, however, the plurality of peripheral devices connected to the host controller share the maximum data transmission bandwidth (SS: 5 Gbps, NSS: 480 Mbps) of the connected host controller.

Figure 2:
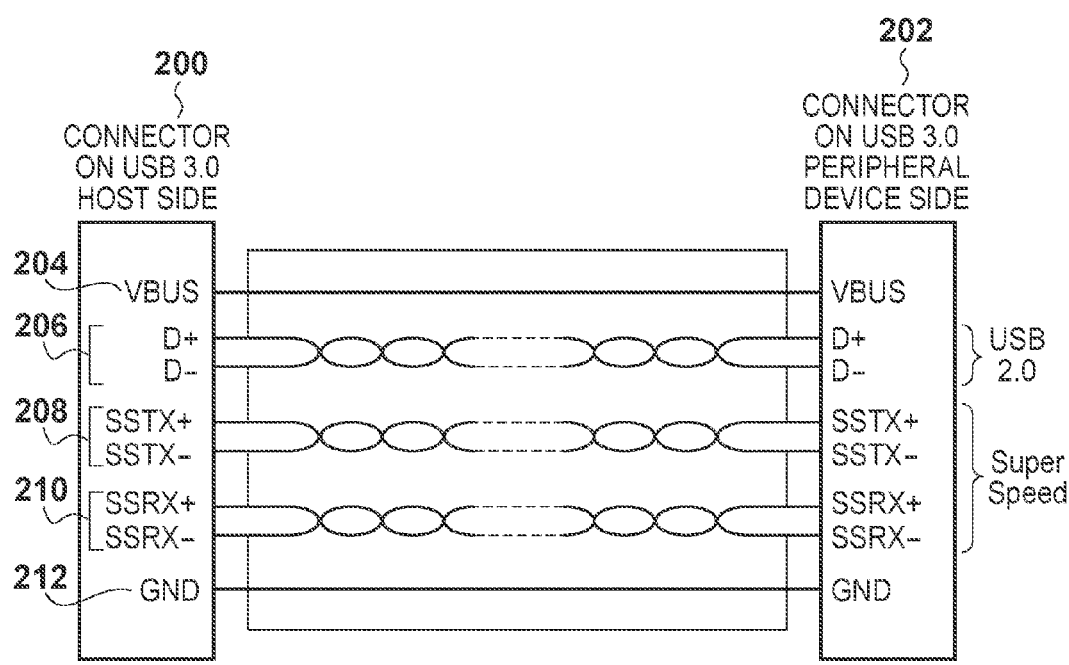
FIG. 2 is a view showing the signal lines in a USB 3.0 cable.

FIG. 2 is a view showing the signal lines in a USB 3.0 cable. A connector 200 on the USB 3.0 host side indicates one of connectors #1 to #3 of the host device 100. A connector 202 on the USB 3.0 peripheral device side indicates the connector of the device 120.

A signal line pair 206 (D+ and D−) is used in the NSS (USB 2.0) mode connection. That is, in the NSS mode, half-duplex communication is performed using the signal line pair 206. However, a signal line pair 208 (SSTX+ and SSTX−) is used for transfer from the host device to the device in the SS mode connection. A signal line pair 210 (SSRX+ and SSRX−) is used for transfer from the device to the host device in the SS mode connection. That is, in the SS mode, full-duplex communication is performed using the signal line pairs 208 and 210. A signal line 204 (VBUS) and a signal line 212 (GND) are used in both the NSS mode connection and the SS mode connection.

Figure 3:
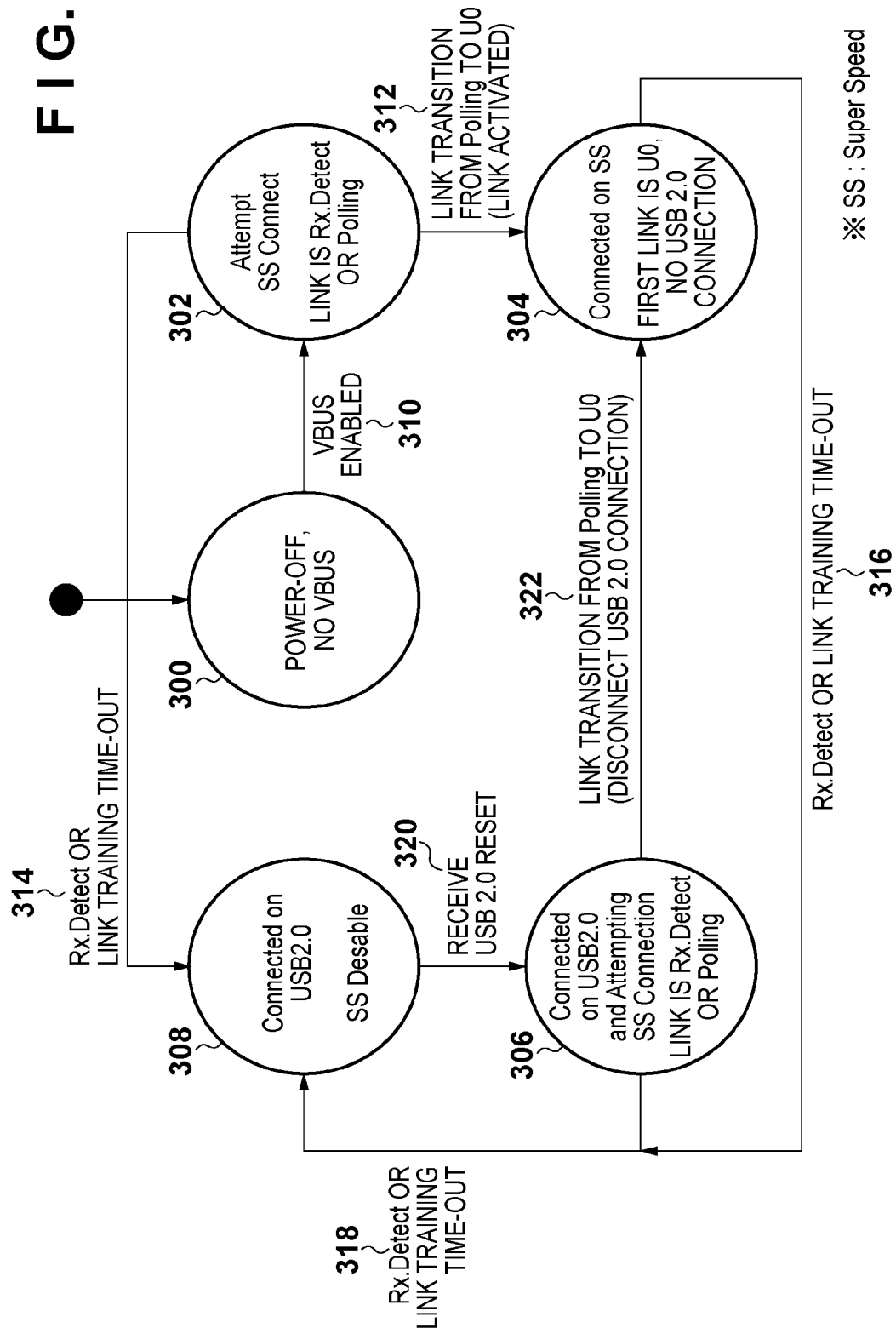
FIG. 3 is a state transition diagram of a USB 3.0 peripheral device.

FIG. 3 is a state transition diagram of the USB 3.0 peripheral device. That is, FIG. 3 illustrates the states of the device 120 and transitions between the states.

A state 300 represents a state in which the signal of the signal line 204 (VBUS) is absent, that is, a state in which the device 120 is not physically connected to the host device 100.

A state 302 represents that the SS data signal line of the device 120 is in the Rx.Detect or Polling state. Rx.Detect is a state to detect whether or not the device 120 is physically (electrically) connected to the SS link on the USB 3.0 host side. Polling is a state in which link training is performed. More specifically, in this state, handshake is performed between the links of the host device 100 and the device 120, and whether or not they are communicable is detected.

A state 304 represents a state in which an SS connection is established between the host device 100 and the device 120. A state 306 represents a state in which an NSS (USB 2.0) mode connection is established between the host device 100 and the device 120, and that the SS link is in the Rx.Detect or Polling state. A state 308 represents a state in which the NSS (USB 2.0) mode connection is established between the host device 100 and the device 120, and that the SS link is disabled.

Conditions of state transitions will be explained next. A transition 310 represents a transition when the VBUS is enabled, that is, when the host device 100 and the device 120 are connected by the USB cable. A transition 312 represents a transition when the SS link transits from Polling to U0, that is, when handshake is performed between the SS links, and the links are activated.

Transitions 314, 316, and 318 represent transitions upon Rx.Detect or link training time-out. A transition 320 represents a transition upon receiving an NSS (USB 2.0) reset signal. A transition 322 represents a transition when the SS link transits from Polling to U0, that is, when handshake is performed between the SS links, and the links are activated.

As may be understood from FIG. 3, in general, when a device conforming to USB 3.0 is connected to the connector of a host device conforming to USB 3.0, connection (SS mode connection) via the SS bus 106 is performed. When a USB 2.0 (or USB 1.1) device is connected to the connector of the USB 3.0 host device, connection (NSS mode connection) via the NSS bus 108 is performed.

<Device Arrangement>

Figure 4:
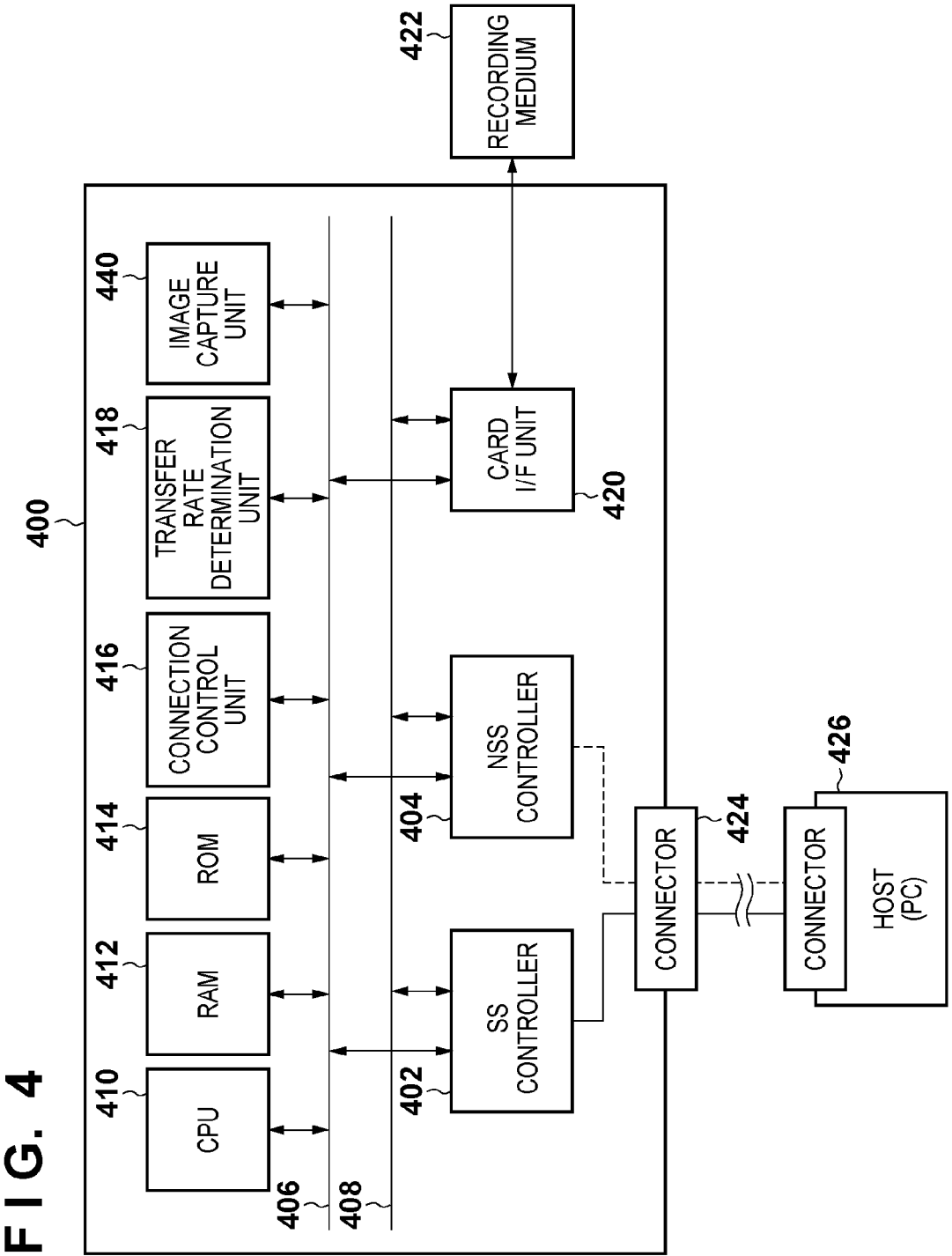
FIG. 4 is a block diagram of a communication control apparatus according to the first embodiment.

FIG. 4 is a block diagram of the device 400 according to the first embodiment. The device 400 includes a connector 424 (second interface) connected to a controller 402 (to be referred to as an SS 402 hereinafter) to be used in the SS mode connection and a controller 404 (to be referred to as an NSS 404 hereinafter) to be used in the NSS mode connection. The controllers are connected to a data bus 408. Note that the device 400 is assumed to be connected to a host 426 serving as an external device via the connector 424 in the following explanation.

A connection control unit 416 controls connection in the SS and NSS modes. A transfer rate determination unit 418 determines the data transfer rate of a recording medium 422 connected via a card interface 420 (first interface). Note that the recording medium 422 is a detachable recording medium and is assumed to be a card (SD card) complying with the SD standards in the following explanation. In this case, the device 400 corresponds to a so-called card reader (reading device).

Embodiments of the present invention is not limited to the SD card, as a matter of course, and recording media of various recording schemes are usable. Typical examples are a semiconductor memory (e.g., a flash memory or a RAM) and a hard disk drive. Other memory card standards (e.g., CF standards) may be used as the connection interface standards. A USB interface may also be used. Note that when the interface is a USB interface, the device 400 of the first embodiment corresponds to a USB hub, and the recording medium is generally recognized as a peripheral device of mass storage class.

A ROM 414 stores various parameters and various control programs to be executed by a CPU 410. A RAM 412 is used as the program area and work area of the CPU 410. The CPU 410 executes the control programs to control the above-described units via a CPU bus 406 and execute processing to be described later. Note that the communication control apparatus 400 may be controlled by one piece of hardware, or a plurality of pieces of hardware may share the processing to control the entire apparatus. An image capture unit 440 includes an optical lens, a sensor such as a CCD, a shutter, and a stop. The image capture unit 440 captures an object and converts it into image data. The converted image data is recorded on the recording medium 422 via the RAM 412 and the card I/F unit 420. Note that the image capture unit 440 may perform image capture and record image data on the recording medium 422 independently of the control of the SS 402 and the NSS 404. That is, image capture and image data recording on the recording medium 422 by the image capture unit 440 may be executed even when the host (PC) 426 is not connected to the connector 424.

<Connection Control Method>

Figure 5:
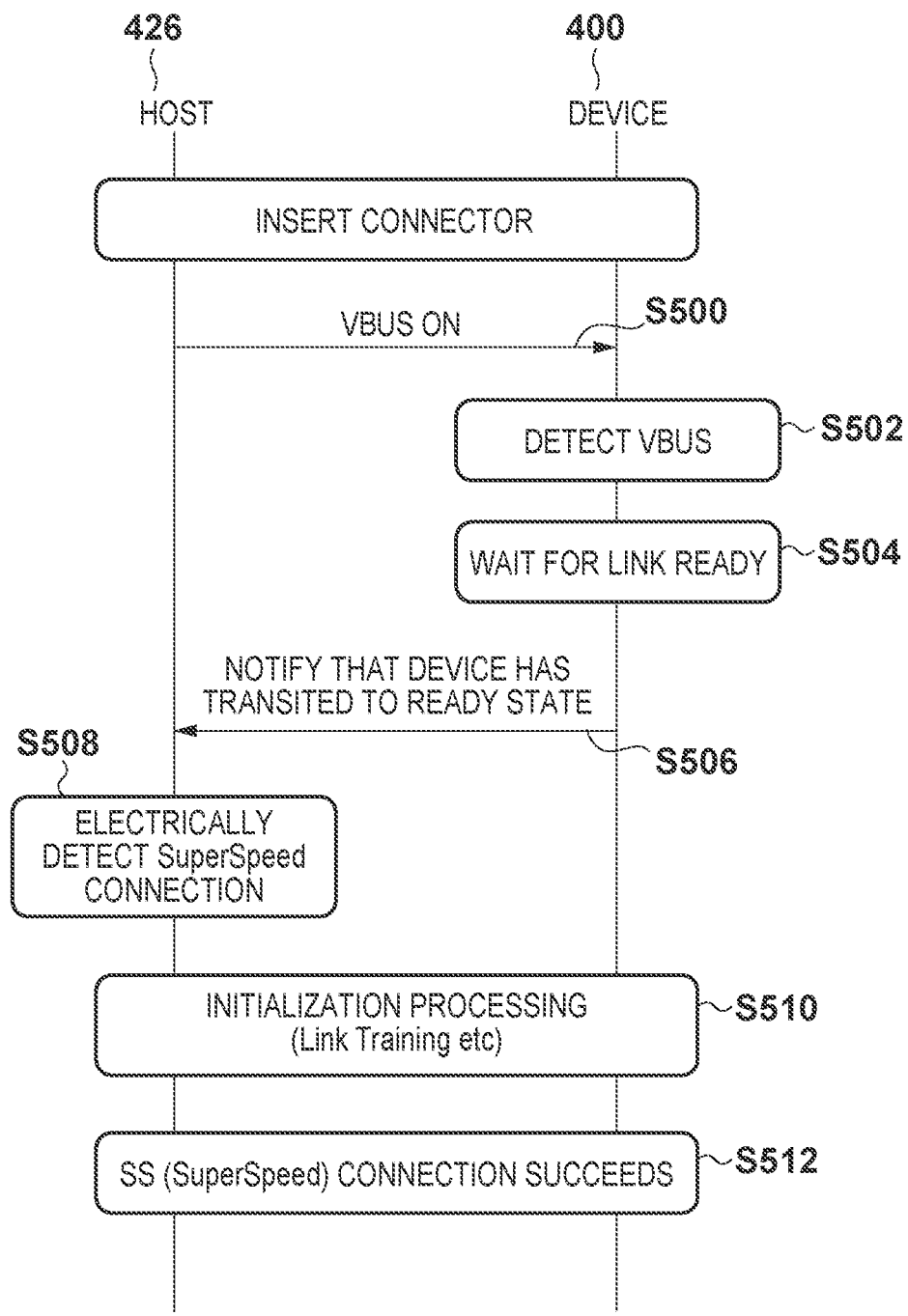
FIG. 5 is a sequence chart of connection in SS mode.

The USB 3.0 connection sequence will be described first. FIG. 5 is a chart for explaining the connection sequence in the SS mode.

In operation S500, when the device 400 is connected via the connector, the host 426 turns on the VBUS. In operation S502, the device 400 detects VBUS ON. In operation S504, the device 400 waits until its own SS link changes to Ready.

In operation S506, the device 400 notifies the host 426 that its own SS link has changed to Ready. In operation S508, upon receiving the notification from the device 400, the host 426 detects that the SS link is electrically connected to the device 400 via the terminal in the connection connector. In operation S510, both the host 426 and the device 400 execute link initialization processing between the SS links. In operation S512, the SS mode connection is established.

Connection control according to the first embodiment will be described using two use cases based on the chronological order of connection between the recording medium 422 (for example, SD card) and the device 400 and connection between the host 426 and the device 400.

<Case 1: When Host 426 and Device 400 are Connected after Recording Medium 422 and Device 400 are Connected>

Figure 6:
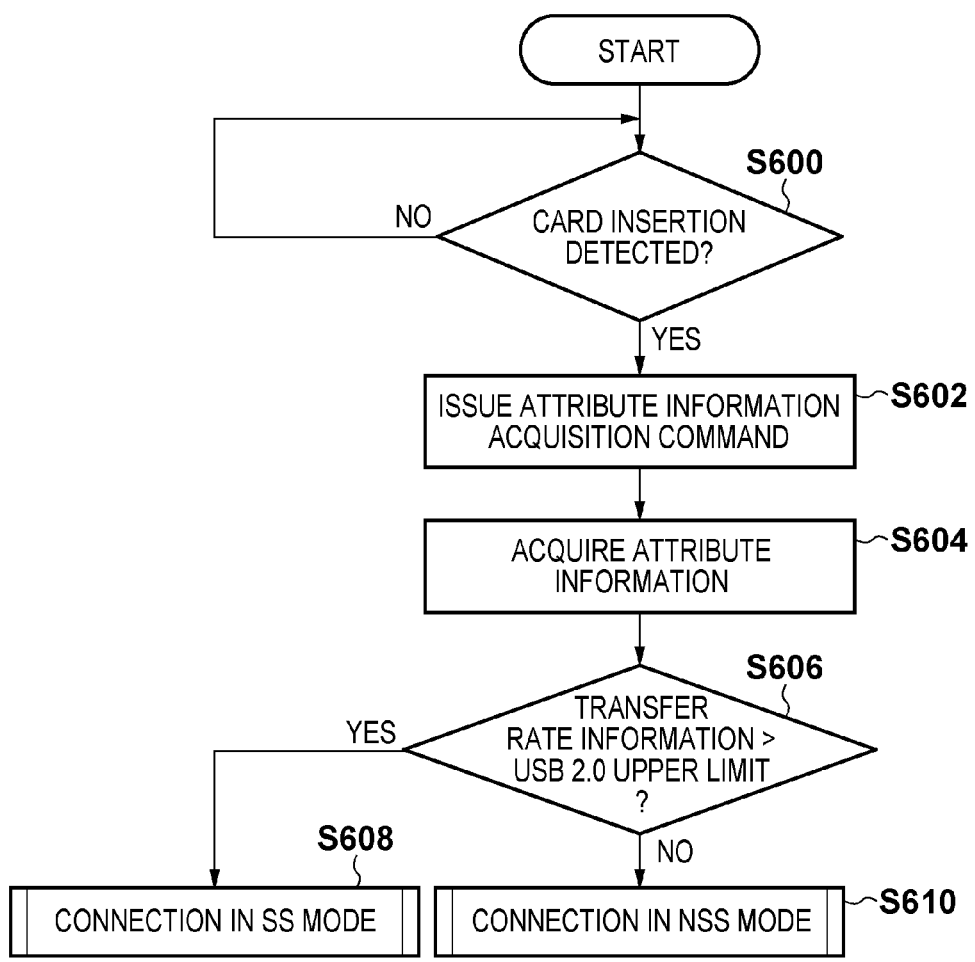
FIG. 6 is an operation flowchart illustrating connection control (case 1).

FIG. 6 is an operation flowchart illustrating connection control in case 1.

In operation S600, the card interface 420 monitors whether or not the recording medium 422 is connected. When the recording medium 422 is connected, the process advances to operation S602. In operation S602, the transfer rate determination unit 418 controls the card interface 420 to issue an attribute information acquisition command to the recording medium 422. In operation S604, the transfer rate determination unit 418 acquires attribute information returned from the recording medium 422.

In operation S606, the transfer rate determination unit 418 determines based on class information (representing transfer rate information) included in the attribute information acquired in operation S604 whether or not the transfer rate of the recording medium 422 exceeds the maximum transfer rate (480 Mbps) of USB 2.0. If YES, the process advances to operation S608 to perform connection in the SS mode in accordance with the sequence described with reference to FIG. 5 when the host 426 is connected to the device 400. On the other hand, if NO, the process advances to operation S610 to perform connection in the NSS (USB 2.0) mode in accordance with a sequence to be described later with reference to FIG. 7 when the host 426 is connected to the device 400.

Figure 7:
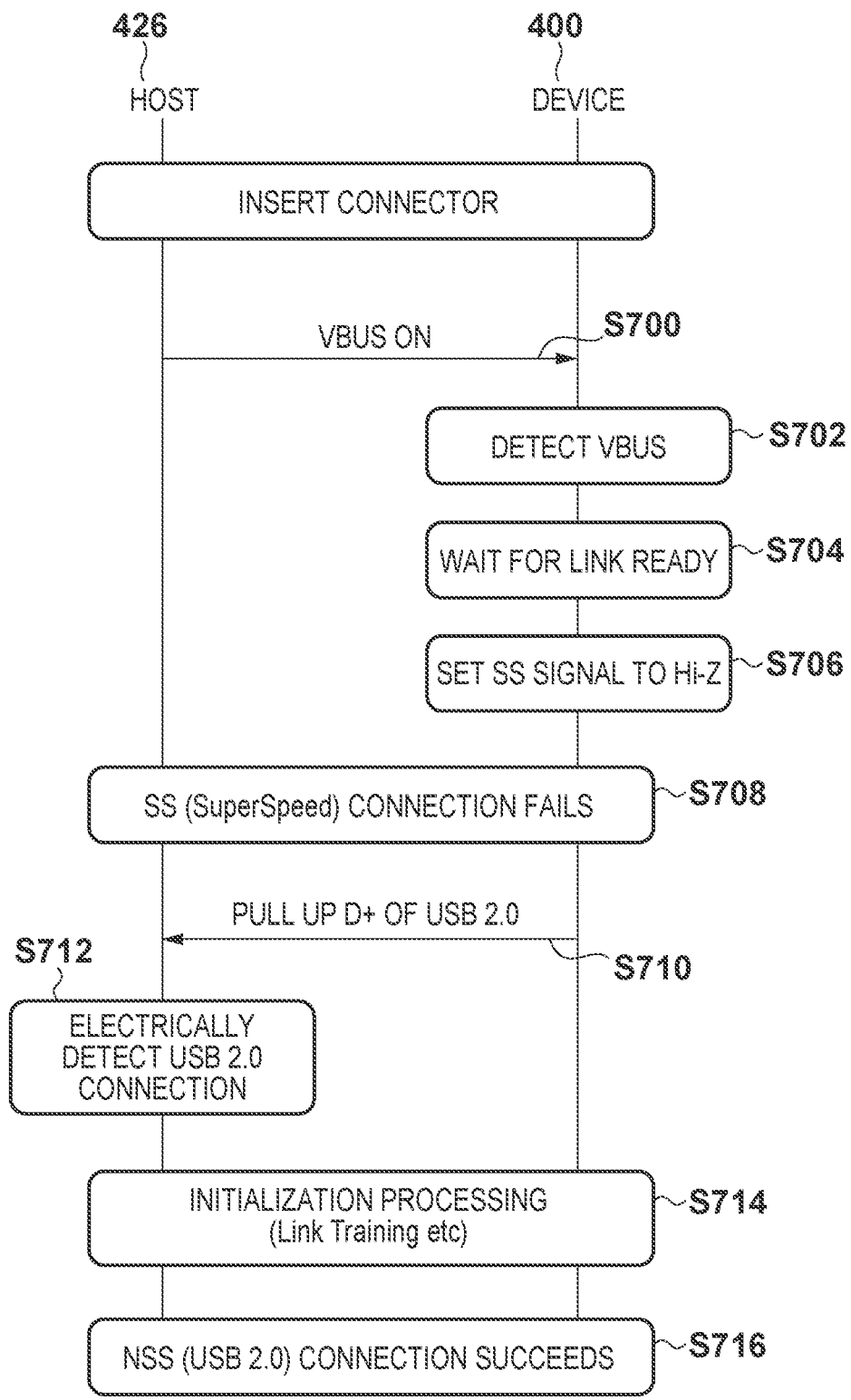
FIG. 7 is a sequence chart of connection in NSS mode (case 1).

FIG. 7 is a sequence chart of connection in the NSS (USB 2.0) mode in case 1. FIG. 7 illustrates details of a portion corresponding to operation S610 of FIG. 6.

In operation S700, when the device 400 is connected via the connector, the host 426 turns on the VBUS. In operation S702, the device 400 detects VBUS ON. In operation S704, the device 400 waits until its own SS link changes to Ready.

In operation S706, the device 400 controls the SS 402 to set the SSTX 208 and the SSRX 210 serving as the SS mode signal lines to high impedance (Hi-Z). With this operation, connection in the SS mode automatically fails, and the host 426 determines that the device 400 does not support the SS mode (S708).

In operation S710, the device 400 controls the NSS 404 to pull up the D+ of the USB 2.0 signal lines (set the voltage to Hi level). In operation S712, because the D+ is pulled up, the host 426 detects that the USB 2.0 link is electrically connected to the device 400 via the terminal in the connection connector. In operation S714, both the host 426 and the device 400 execute link initialization processing between the NSS links. In operation S716, the NSS mode connection is established.

<Case 2: When Recording Medium 422 and Device 400 are Connected after Host 426 and Device 400 are Connected>

Figure 8:
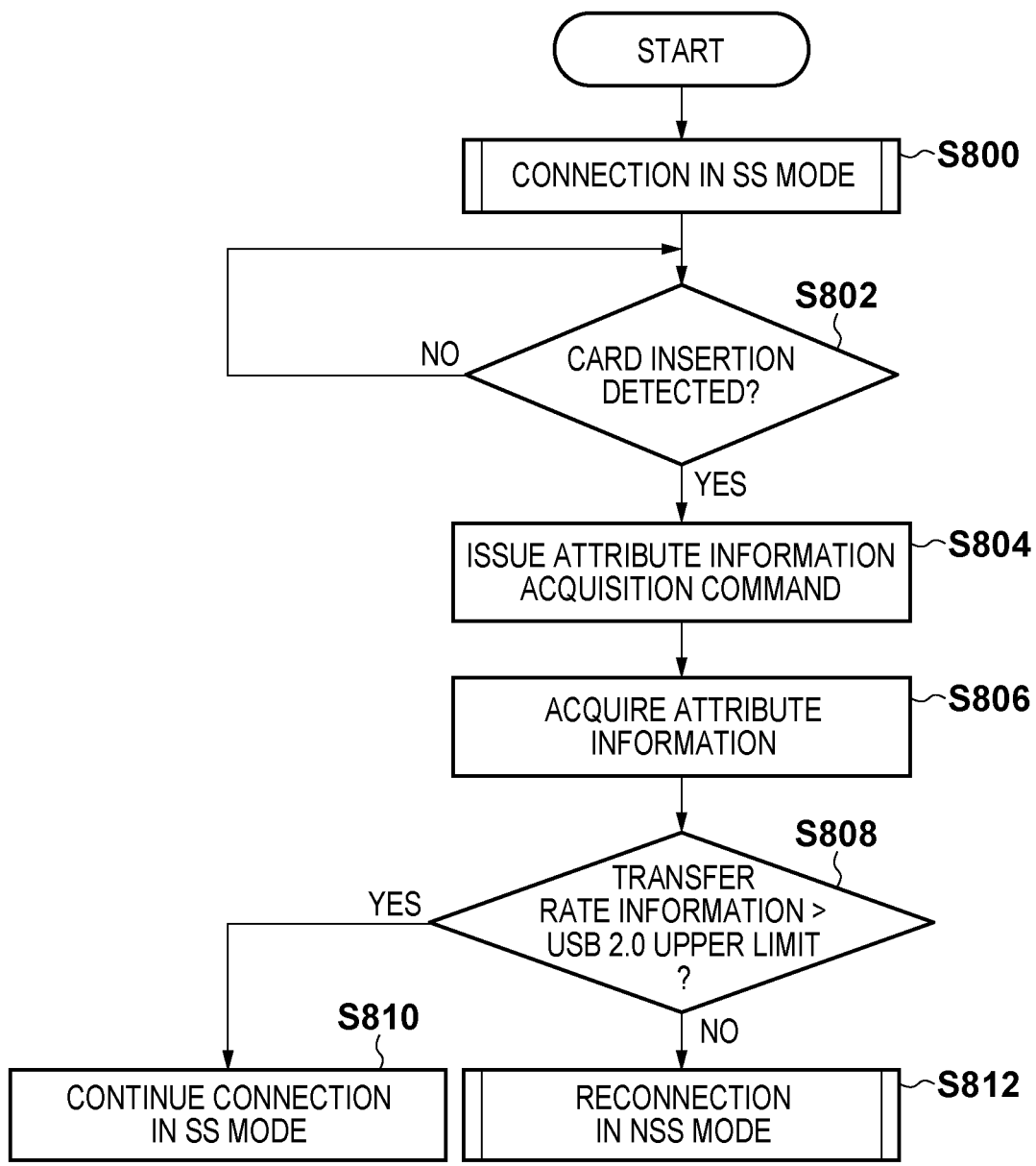
FIG. 8 is an operation flowchart illustrating connection control (case 2).

FIG. 8 is an operation flowchart illustrating connection control in case 2.

In operation S800, when the host 426 is connected to the device 400, connection in the SS mode is performed in accordance with the sequence described with reference to FIG. 5. In operation S802, the card interface 420 monitors whether or not the recording medium 422 is connected. When the recording medium 422 is connected, the process advances to operation S804. In operation S804, the transfer rate determination unit 418 controls the card interface 420 to issue an attribute information acquisition command to the recording medium 422. In operation S806, the transfer rate determination unit 418 acquires attribute information returned from the recording medium 422.

In operation S808, the transfer rate determination unit 418 determines based on class information included in the attribute information acquired in operation S806 whether or not the transfer rate of the recording medium 422 exceeds the maximum transfer rate (480 Mbps) of USB 2.0. If YES, the process advances to operation S810 to continue connection in the SS mode when the host 426 is connected to the device 400. On the other hand, if NO, the process advances to operation S812 to perform reconnection in the NSS (USB 2.0) mode in accordance with a sequence to be described later with reference to FIG. 9 when the host 426 is connected to the device 400.

Figure 9:
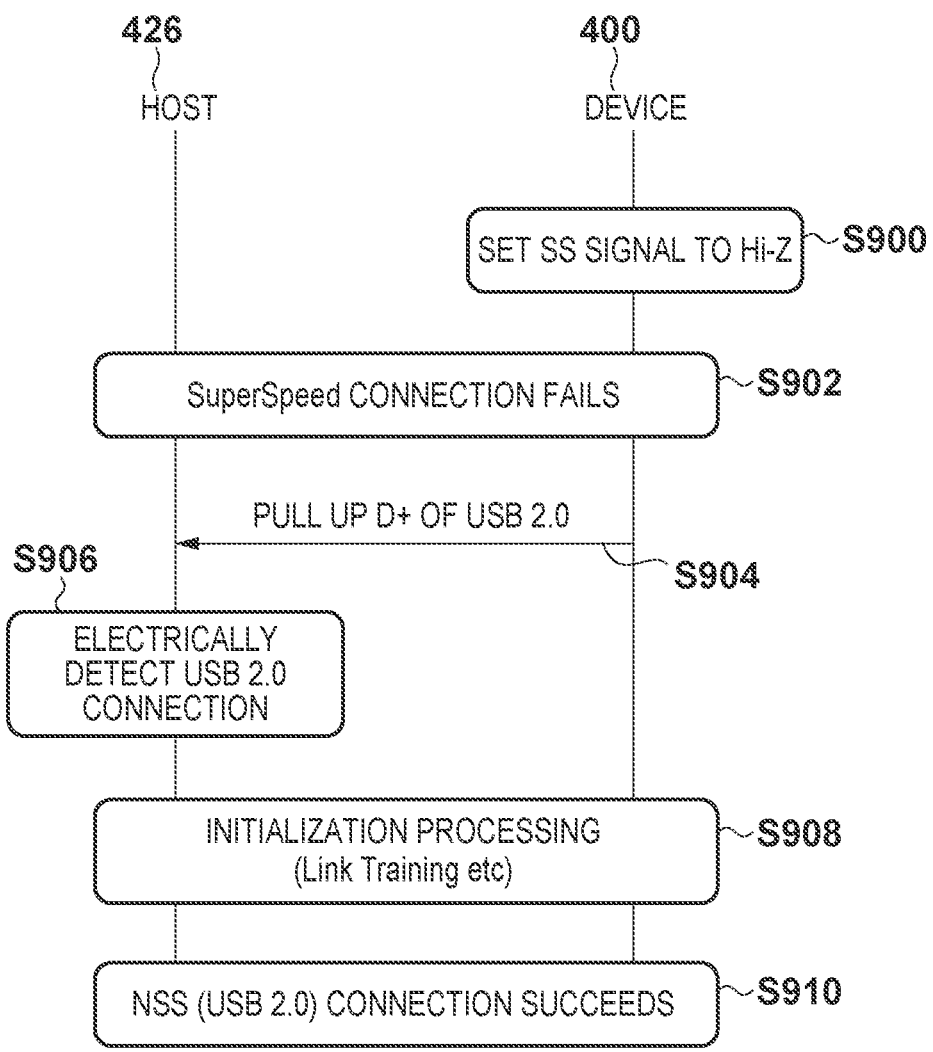
FIG. 9 is a sequence chart of connection in NSS mode (case 2).

FIG. 9 is a sequence chart of connection in the NSS (USB 2.0) mode in case 2. FIG. 9 illustrates details of a portion corresponding to operation S812 of FIG. 8.

In operation S900, the device 400 controls the SS 402 to set the SSTX 208 and the SSRX 210 serving as the SS mode signal lines to high impedance (Hi-Z). With this operation, connection in the SS mode fails. That is, the connection in the SS mode established in operation S800 is disconnected, and the host 426 determines that the device 400 does not support the SS mode (S902).

In operation S904, the device 400 controls the NSS 404 to pull up the D+ of the USB 2.0 signal lines (set the voltage to Hi level). In operation S906, since the D+ is pulled up, the host 426 detects that the USB 2.0 link is electrically connected to the device 400 via the terminal in the connection connector. In operation S908, both the host 426 and the device 400 execute link initialization processing between the NSS links. In operation S910, the NSS mode connection is established.

As described above with regard to cases 1 and 2, according to the first embodiment, when the data transfer rate of the recording medium 422 connected to the device 400 is less than or equal to a predetermined threshold, control is executed to perform connection in the NSS (USB 2.0) mode. Hence, when another device which requires a data transfer rate greater than the predetermined threshold (480 Mbps) is connected, the other device may occupy the bandwidth of the SS mode connection.

Second Embodiment

In the second embodiment, a form will be explained in which a host decides the USB connection mode between it and a device.

<Device Arrangement>

Figure 10:
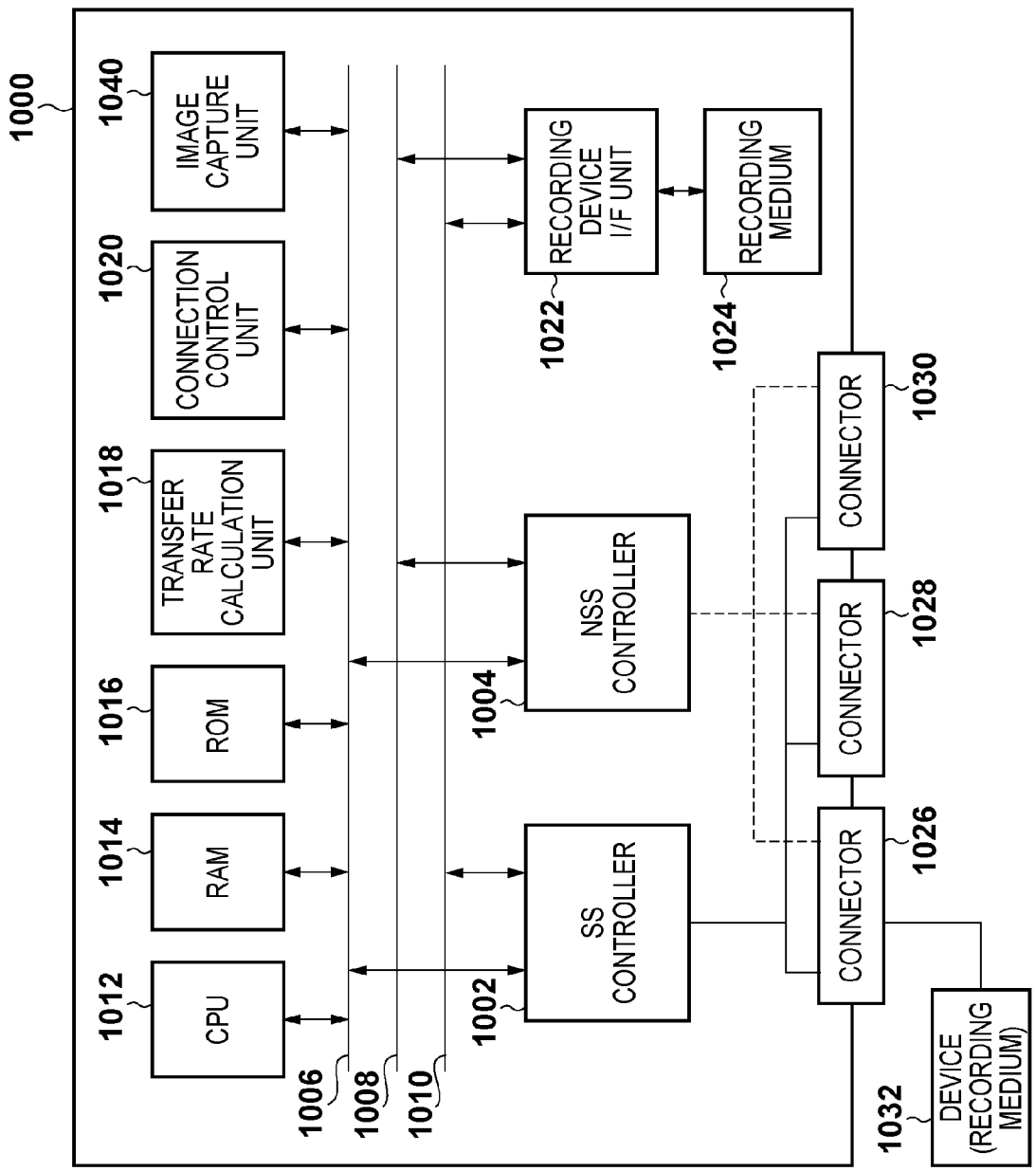
FIG. 10 is a block diagram of a communication control apparatus according to the second embodiment.

FIG. 10 is a block diagram of a communication control apparatus 1000 (to be referred to as a host 1000 hereinafter) according to the second embodiment. The host 1000 includes a controller 1002 (to be referred to as an SS 1002 hereinafter) to be used in the SS mode connection and a host controller 1004 (to be referred to as an NSS 1004 hereinafter) to be used in the NSS mode connection. The host 1000 also includes connectors 1026 to 1030. The controllers are connected to a data bus 1010 dedicated to the SS mode and a data bus 1008 dedicated to the NSS (USB 2.0) mode, respectively.

A connection control unit 1020 controls connection in the SS and NSS modes. A transfer rate calculation unit 1018 calculates the transfer rate by actually performing data transfer for devices connected to the connectors 1026 to 1030.

A recording device interface 1022 is, for example, an ATA interface to be used to connect an external recording device. This interface is used to, for example, record data read out from a device 1032 via the connector 1026 on a recording medium 1024 such as a hard disk drive (HDD).

A ROM 1016 stores various parameters and various control programs to be executed by a CPU 1012. A RAM 1014 is used as the program area and work area of the CPU 1012. The CPU 1012 executes the control programs to control the above-described units via a CPU bus 1006 and execute processing to be described later. Note that the host 1000 may be controlled by one piece of hardware, or a plurality of pieces of hardware may share the processing to control the entire apparatus. An image capture unit 1040 includes an optical lens, a sensor such as a CCD, a shutter, and a stop. The image capture unit 1040 captures an object and converts it into image data. The converted image data is recorded on the recording medium 1024 via the RAM 1014 and the recording device I/F unit 1022. Note that the image capture unit 1040 may perform image capture and record image data on the recording medium 1024 independently of the control of the SS 1002 and the NSS 1004. That is, image capture and image data recording on the recording medium 1024 by the image capture unit 1040 may be executed even when the device 1032 is not connected to the connector 1026.

<Connection Control Method>

Figure 11:
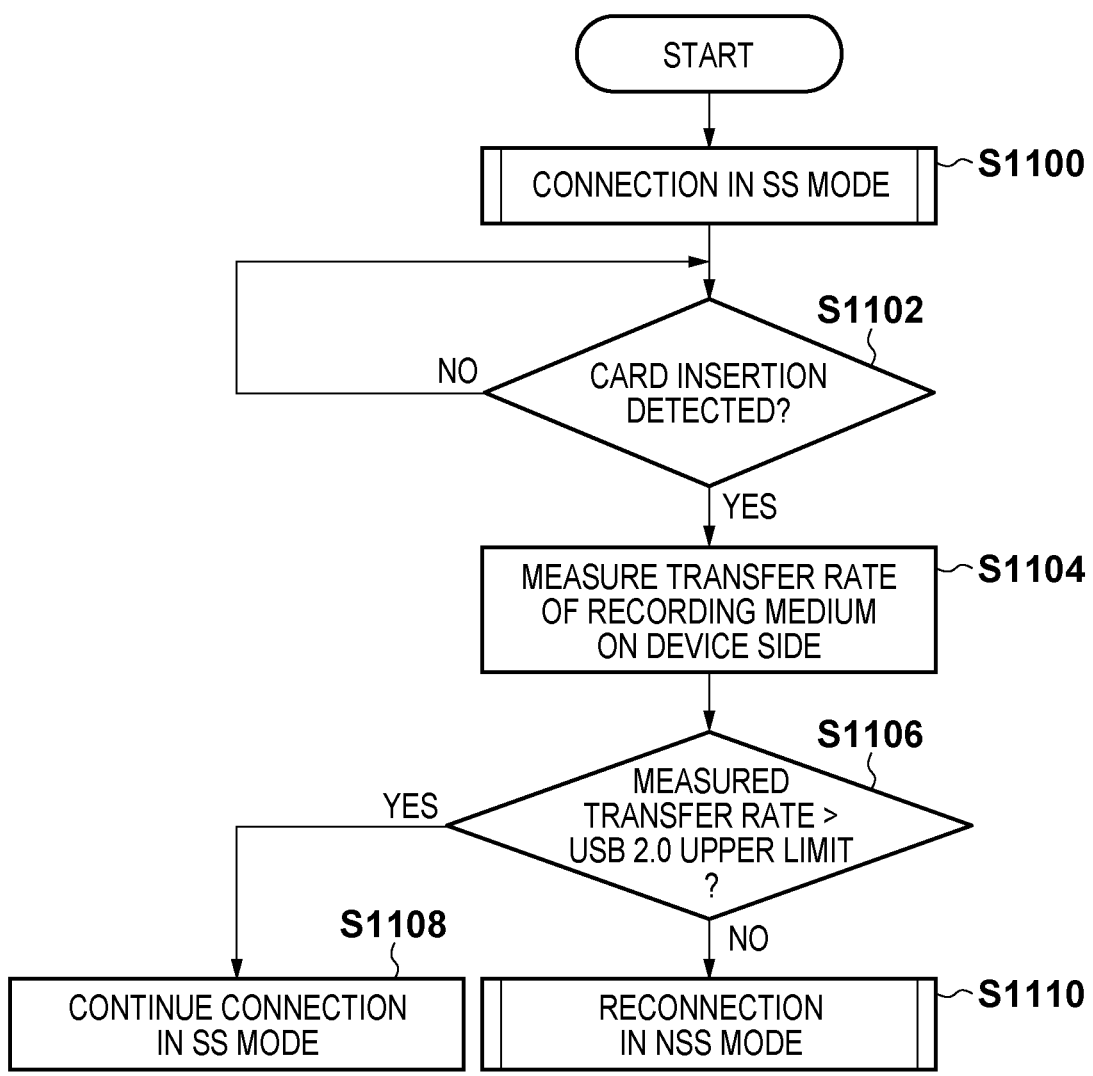
FIG. 11 is an operation flowchart illustrating connection control.

FIG. 11 is an operation flowchart illustrating connection control according to the second embodiment.

In operation S1100, when the host 1000 is connected to the device 1032, connection in the SS mode is performed in accordance with the sequence described with reference to FIG. 5. In operation S1102, the host 1000 confirms whether or not the recording medium is connected to the device 1032. When the recording medium is connected, the process advances to operation S1104. In operation S1104, the host 1000 measures the transfer rate of the recording medium connected to the device 1032. For example, the host 1000 measures the transfer rate by executing read and write of data of a predetermined size for a specific area of the recording medium attached to the device 1032.

In operation S1106, the host 1000 determines whether or not the transfer rate measured in operation S1104 exceeds the maximum transfer rate (480 Mbps) of USB 2.0. If YES, the process advances to operation S1108 to continue connection in the SS mode when the host 1000 is connected to the device 1032. On the other hand, if NO, the process advances to operation S1110 to perform reconnection in the NSS (USB 2.0) mode in accordance with a sequence to be described later with reference to FIG. 12 when the host 1000 is connected to the device 1032.

Figure 12:
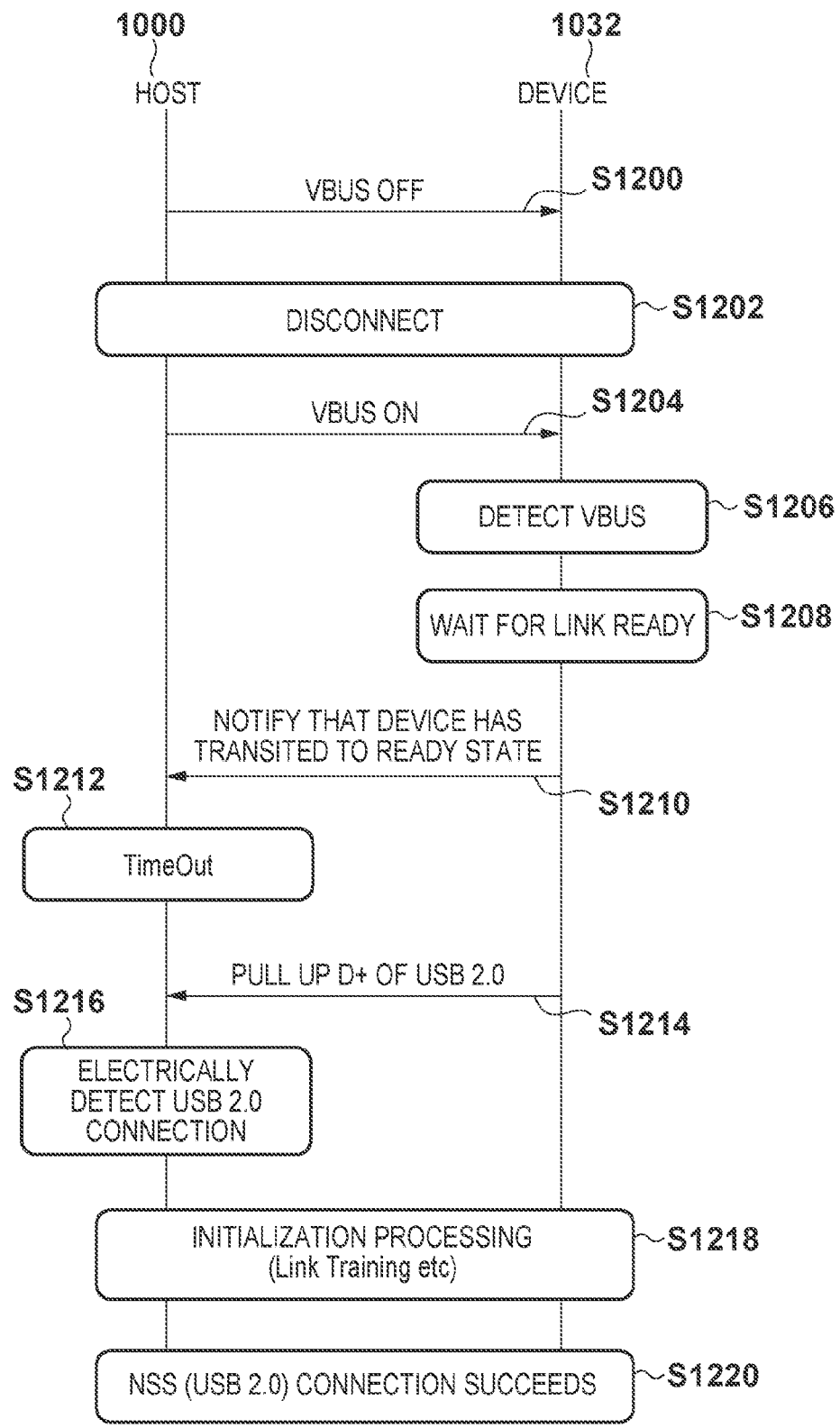
FIG. 12 is a sequence chart of connection in NSS mode.

FIG. 12 is a sequence chart of connection in the NSS (USB 2.0) mode according to the second embodiment. FIG. 12 illustrates details of a portion corresponding to operation S1110 of FIG. 11.

In operation S1200, the host 1000 temporarily turns off the VBUS. With this operation, connection in the SS mode fails. That is, the connection in the SS mode established in operation S1100 is disconnected (S1202). In operation S1204, the host 1000 turns on the VBUS again. In operation S1206, the device 1032 detects VBUS ON. In operation S1208, the device 1032 waits until its own SS link changes to Ready.

In operation S1210, the device 1032 notifies the host 1000 that its own SS link has changed to Ready. In operation S1212, the host 1000 controls the SS 1002 not to respond to the handshake (connection request) to the SS link of the device 1032 and to change the connection to the device 1032 to NSS mode (USB 2.0) connection. The handshake thus times out. For this reason, in operation S1214, the device 1032 determines that the host 1000 does not support the SS mode, and pulls up the D+ to connect in the NSS (USB 2.0) mode. In operation S1216, since the D+ is pulled up, the host 1000 detects electrical connection of the NSS (USB 2.0). In operation S1218, both the host 1000 and the device 1032 execute link initialization processing between the NSS links. In operation S1220, the NSS mode connection is established.

As described above, according to the second embodiment, when the data transfer rate of the recording medium connected to the device 1032 connected to the host 1000 is less than or equal to a predetermined threshold (480 Mbps), control is executed to perform connection in the NSS (USB 2.0) mode. Hence, when another device which requires a data transfer rate greater than the predetermined threshold (480 Mbps) is connected to the host 1000, the other device may occupy the bandwidth of the SS mode connection.

OTHER EMBODIMENTS

Aspects of embodiments of the present invention may also be realized by a computer of a system or apparatus (or devices such as a CPU or MPU) that reads out and executes a program recorded on a memory device to perform the functions of the above-described embodiment(s), and by a method, the operations of which are performed by a computer of a system or apparatus by, for example, reading out and executing a program recorded or stored on a memory device to perform the functions of the above-described embodiment(s). For this purpose, the program is provided to the computer, for example, via a network or from recording media of various types serving as the memory device (e.g., computer-readable medium). Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a communication control apparatus, a detachable recording medium, an external device, a first bus controller, a second bus controller). In addition, the operations in the method transform the elements or parts from one state to another state. The transformation is particularized and focused on controlling a communication control apparatus. The transformation provides a different function or use such as determining a data transfer rate of a detachable recording medium, controlling to establish a connection to the external device, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-235876, filed Oct. 20, 2010 and 2011-213383, filed, Sep. 28, 2011, which are hereby incorporated by reference herein in their entirety.

What is claimed is:

1. A communication control apparatus comprising:
a plurality of interfaces each including a first bus controlled by a first bus controller and a second bus controlled by a second bus controller, the second bus having a maximum transfer rate less than that of the first bus, wherein a communication performed via the first bus and a communication performed via the second bus are controlled independently;
a control unit configured to establish a communication link with a reading device via the first bus; and
a determination unit configured to determine a data transfer rate of a detachable recording medium connected to the reading device in a case where the reading device including a first interface to be connected to the detachable recording medium and a second interface including a first bus and a second bus is connected to any of the interfaces of the communication control apparatus, wherein, in a case where the reading device is connected to any of the interfaces of the communication control apparatus, the first bus of the second interface of the reading device is connected to the first bus of the interface of the communication control apparatus, and the second bus of the second interface of the reading device is connected to the second bus of the interface of the communication control apparatus,
wherein each of the first interface and the second interface complies with a different standard from each other,
wherein, in a case where the data transfer rate of the detachable recording medium connected to the reading device determined by the determination unit exceeds a predetermined threshold, the control unit maintains the communication link with the reading device via the first bus, and
wherein, in a case where the data transfer rate of the detachable recording medium connected to the reading device determined by the determination unit does not exceed the predetermined threshold, the control unit disconnects the communication link with the reading device via the first bus, receives a notification, which indicates that it is possible to establish a communication link via the first bus, transmitted from the reading device after the disconnection is completed, and establishes, by not responding to the notification, a communication link with the reading device via the second bus.

2. The apparatus according to claim 1, wherein the determination unit determines the data transfer rate of the detachable recording medium connected to the reading device by reading out transfer rate information stored in the detachable recording medium in advance via the reading device.

3. The apparatus according to claim 1, wherein the determination unit determines the data transfer rate of the detachable recording medium connected to the reading device by executing data read and write for the detachable recording medium via the reading device.

4. The apparatus according to claim 1, wherein, in a case where the detachable recording medium is newly connected to the reading device while the communication link with the reading device via the first bus is already established, the determination unit determines a data transfer rate of the detachable recording medium connected to the reading device via the reading device and switches a bus on which a communication with the reading device is performed in accordance with a determined result.

5. The apparatus according to claim 1, wherein the second interface comprises an interface complying with the Universal Serial Bus (USB) 3.0 specification,
wherein the first bus controller comprises a SuperSpeed (SS) controller, and
wherein the second bus controller comprises a Non-SuperSpeed (NSS) controller.

6. A method of controlling a communication control apparatus including a plurality of interfaces, the method comprising:
controlling a first bus by a first bus controller;
controlling a second bus by a second bus controller, the second bus having a maximum transfer rate less than that of the first bus, wherein a communication performed via the first bus and a communication performed via the second bus are controlled independently;
establishing a communication link with a reading device via the first bus by a control unit;
determining a data transfer rate of a detachable recording medium in a case where the reading device, which includes a first interface to be connected to the detachable recording medium and a second interface that includes the first bus and the second bus, is connected to any of the interfaces of the communication control apparatus, wherein, in a case where the reading device is connected to any of the interfaces of the communication control apparatus, the first bus of the second interface of the reading device is connected to the first bus of the interface of the communication control apparatus, and the second bus of the second interface of the reading device is connected to the second bus of the interface of the communication control apparatus;
maintaining, by the control unit, the communication link with the reading device via the first bus in a case where the data transfer rate determined in the determining the data transfer rate step exceeds a predetermined threshold; and
switching to a communication link with the reading device via the second bus from the communication link with the reading device via the first bus in a case where the data transfer rate determined in the determining does not exceed the predetermined threshold,
wherein each of the first interface and the second interface complies with a different standard from each other,
wherein, in a case where the data transfer rate of the detachable recording medium connected to the reading device determined in the determining the data transfer rate step exceeds a predetermined threshold, maintaining the communication link with the reading device via the first bus, and
wherein, in a case where the data transfer rate of the detachable recording medium connected to the reading device determined in the determining the data transfer rate step does not exceed the predetermined threshold, disconnecting the communication link with the reading device via the first bus, receiving a notification, which indicates that it is possible to establish a communication link via the first bus, transmitted from the reading device after the disconnection is completed, and establishing, by not responding to the notification, a communication link with the reading device via the second bus.

7. A non-transitory computer-readable storage medium storing computer-executable instructions which, when executed by a computer, cause the computer to function as a communication control apparatus comprising:
a plurality of interfaces each including a first bus controlled by a first bus controller and a second bus controlled by a second bus controller, the second bus having a maximum transfer rate less than that of the first bus, wherein a communication performed via the first bus and a communication performed via the second bus are controlled independently;
a control unit configured to establish a communication link with a reading device via the first bus; and
a determination unit configured to determine a data transfer rate of a detachable recording medium in a case where the reading device, which includes a first interface to be connected to the detachable recording medium and a second interface including the first bus and the second bus, is connected to any of the interfaces of the communication control apparatus,
wherein, in a case where the reading device is connected to any of the interfaces of the communication control apparatus, the first bus of the second interface of the reading device is connected to the first bus of the interface of the communication control apparatus, and the second bus of the second interface of the reading device is connected to the second bus of the interface of the communication control apparatus,
wherein each of the first interface and the second interface is complying with a different standard from each other,
wherein, in a case where the data transfer rate of the detachable recording medium connected to the reading device determined by the determination unit exceeds a predetermined threshold, the control unit maintains the communication link with the reading device via the first bus, and
wherein, in a case where the data transfer rate of the detachable recording medium connected to the reading device determined by the determination unit does not exceed the predetermined threshold, the control unit disconnects the communication link with the reading device via the first bus, receives a notification, which indicates that it is possible to establish a communication link via the first bus, transmitted from the reading device after the disconnection is completed, and establishes, by not responding to the notification, a communication link with the reading device via the second bus.

* * * * *